United States Patent [19]

LeBlanc

[11] Patent Number: 5,111,550
[45] Date of Patent: May 12, 1992

[54] HINGED FLUID PASSAGE ASSEMBLY

[75] Inventor: George F. LeBlanc, North Palm Beach, Fla.

[73] Assignee: United Technologies Corporation, Hartford, Conn.

[21] Appl. No.: 696,468

[22] Filed: May 6, 1991

[51] Int. Cl.⁵ .............................. E05D 1/04
[52] U.S. Cl. .......................... 16/356; 16/379; 239/265.39
[58] Field of Search ............ 16/356, 355, 362, 378, 16/379, 251, 250, 223, 234; 239/265.29, 265.37, 265.39

[56] References Cited

U.S. PATENT DOCUMENTS

| 2,557,716 | 6/1951 | Allee | 16/356 |
| 3,964,207 | 6/1976 | Peterson | 16/378 |
| 4,037,405 | 7/1977 | Huenniger et al. | 239/265.37 |
| 4,756,053 | 7/1988 | Madden et al. | 16/378 |

FOREIGN PATENT DOCUMENTS 08862027  3/1961  United Kingdom ............ 16/356

Primary Examiner—Lowell A. Larson
Assistant Examiner—Michael J. McKeon
Attorney, Agent, or Firm—Christopher T. Hayes

[57] ABSTRACT

Disclosed is a hinged fluid passage assembly having seal members which allow fluid to flow from a first component to a second component hinged thereto through a passage between seal members extending from the components and the hinge.

4 Claims, 3 Drawing Sheets

HINGED FLUID PASSAGE ASSEMBLY

DESCRIPTION

1. Technical Field

The present invention relates to hinged assemblies having internal passages through which a fluid, such as cooling air, flows.

2. Background Art

In some applications, a first component must be hinged to a second component in a manner which permits fluid from the first component to flow to the second component. For example, in some vectoring exhaust nozzles on gas turbine engines, cooling air from the convergent flap must pass to the divergent flap through a hinge. As shown in FIG. 1, the convergent flap typically has a set of hollow lugs which mesh with another set of hollow lugs on the divergent flap. A hollow attachment pin extends through each set of lugs thereby securing the convergent flap to the divergent flap.

The attachment pin is typically a hollow tubular member having a plurality of airflow holes which communicate with the interior thereof. The hollow lugs of both the convergent flap and the divergent flap likewise have airflow holes in the surfaces of the lugs which contact the attachment pin. The airflow holes of the lugs and the attachment pin are aligned, thereby permitting cooling air to flow from the hollow lugs of the convergent flap into and through the interior of the attachment pin and out through the airflow holes of the hollow lugs of the divergent flap.

Unfortunately, the restrictive air route of this type of hinge assembly produces a significant pressure drop in the cooling air flowing from the convergent flap to the divergent flap. As a result, cooling air pressure in the divergent flap is reduced to the point where, under certain conditions, a backflow of hot exhaust gas into the divergent flap through the cooling film holes therein can occur.

What is needed is a hinged fluid passage assembly wherein the pressure drop of a fluid flowing therethrough is significantly less than that of the prior art.

DISCLOSURE OF THE INVENTION

It is therefore an object of the present invention to provide a hinged fluid passage assembly which produces a significantly lower pressure drop than that of the prior art.

According to the present invention, the first component and the second component are hinged at lugs connected by an attachment pin. Two part-cylindrical seal members extending between the first and second components form a passage therebetween in which the lugs and pin are located. Fluid from the first component passes through large holes in the first component which communicate with large holes in the second component through the passage.

The flow area provided by the passage and the large holes in the first and second components allows fluid from the interior of the first component to pass to the second component in a direct, relatively unrestricted route. The hinge acts as the structural member required to transmit the loads between the flaps, while allowing the necessary range of pivoting required of vectoring flaps. Thus, the possibility of backflow in applications such as vectoring flaps is reduced.

The foregoing and other features and advantages of the present invention will become more apparent from the following description and accompanying drawings.

BEST MODE FOR CARRYING OUT THE INVENTION

Figure 1:
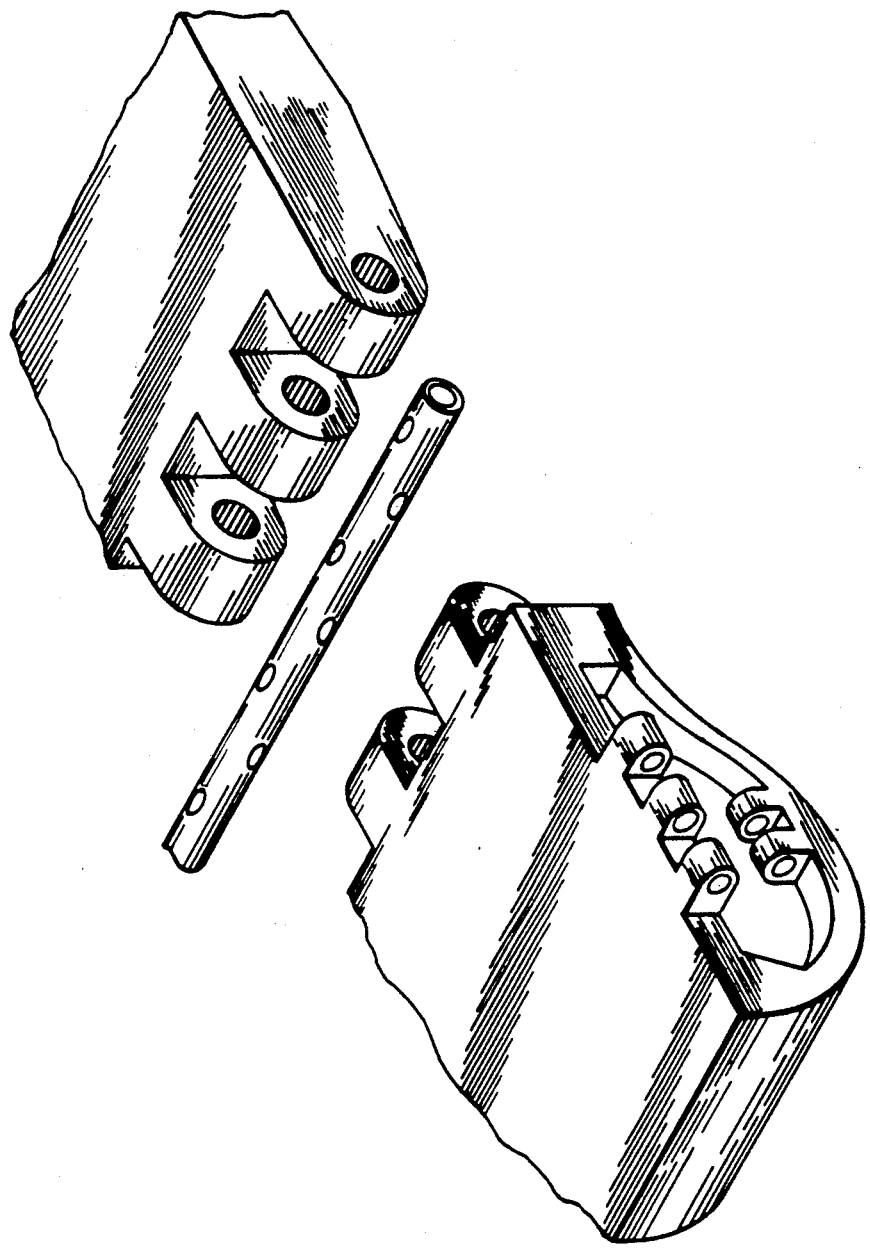
FIG. 1 is an exploded view of a hinged fluid passage assembly of the prior art.
Figure 2:
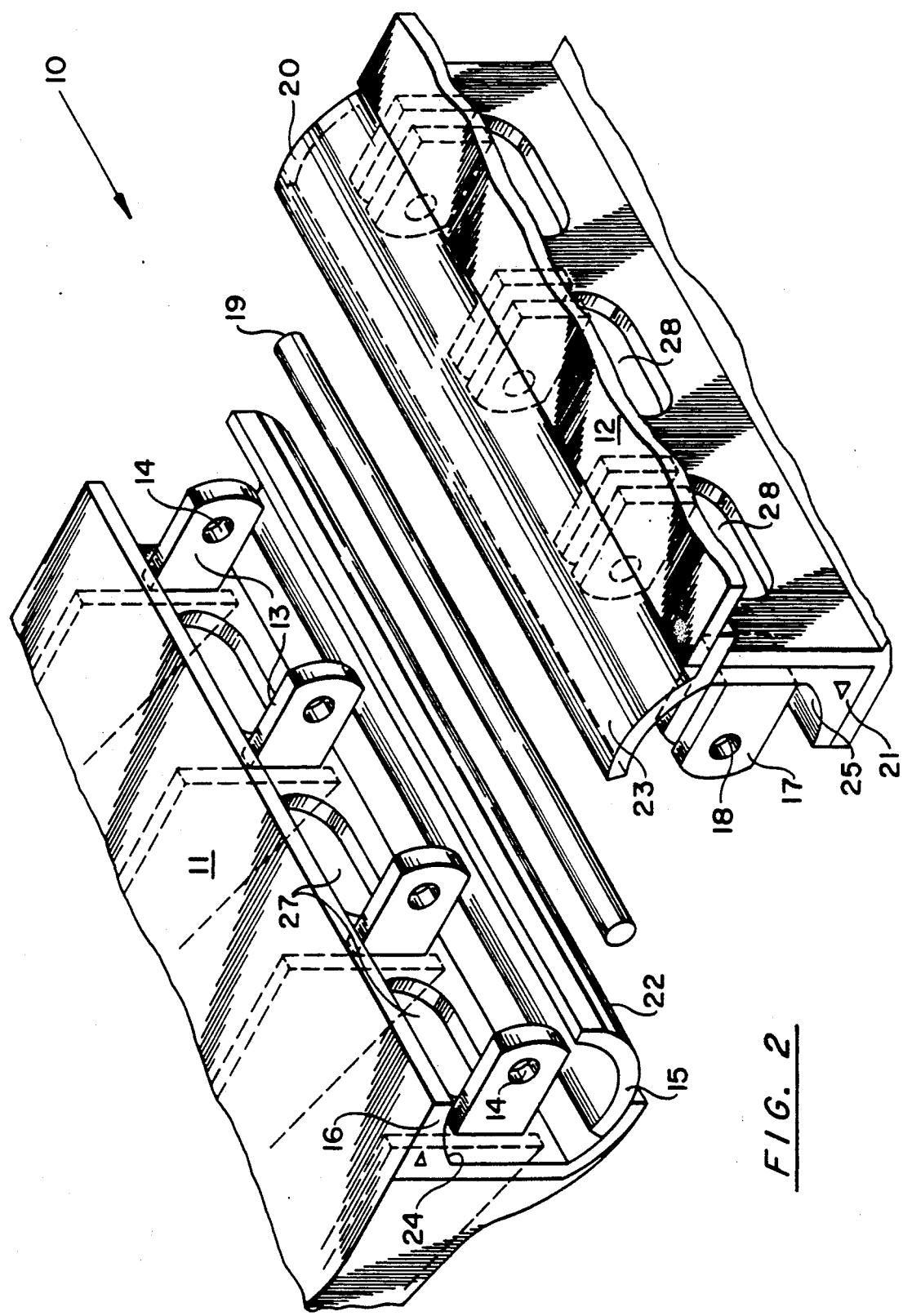
FIG. 2 is an exploded view of the hinged fluid passage assembly of the present invention.

FIG. 2 shows an exploded view of a hinged fluid passage assembly 10 of the present invention used to pivotably connect a first component, such as a convergent flap 11 of a gas turbine engine nozzle, to a second component such as a divergent flap 12 of the same nozzle. Although the hinged fluid passage assembly of the present invention is shown and described as used in a convergent-divergent flap assembly, such use is exemplary only and is not intended to limit the scope of the claims.

The convergent flap has at least one, and preferably a plurality of lugs 13 extending therefrom. Each of the lugs 13 has a pin hole 14 extending therethrough, and each pin hole is aligned with the other pin holes 14 so as to form an axis of rotation about which the divergent flap 12 pivots with respect to the convergent flap 11. Extending from the convergent flap 11 on opposite sides of the lugs 13 is a seal member 15 and a seal support member 16, the purpose of which is discussed in greater detail below.

Figure 3:
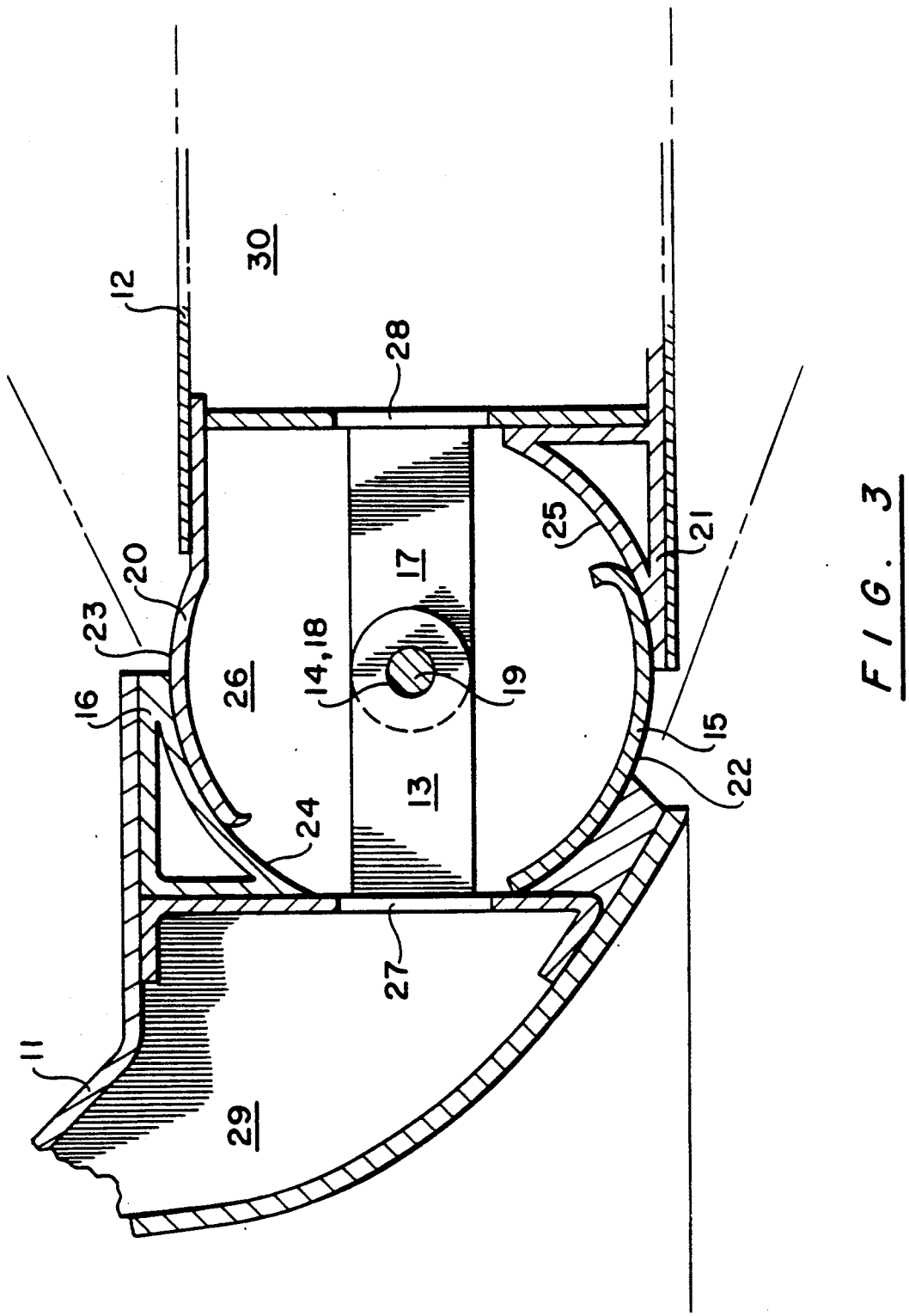
FIG. 3 is a cross-sectional view of the assembled hinged fluid passage assembly shown in FIG. 2.

The divergent flap likewise has a plurality of lugs 17 extending therefrom. Each of the divergent flap lugs 17 has a pin hole 18 therein to receive the hinge pin 19. The lugs 17 of the divergent flap 12 are spaced so as to permit the lugs 13 of the convergent flap 11 to mesh therewith in a manner in which all of the pin holes 14, 18 are aligned along the same axis, as shown in FIG. 3. Extending from the divergent flap 12 on opposite sides of the divergent flap lugs 17 seal member 20 and a seal support member 21. Each of the seal members 15, 20 has a convex part-cylindrical surface 22, 23 and each seal support member 16, 21 has a concave part-cylindrical surface 24, 25.

The convex surface 22, 23 of each flap 11, 12 slidably engages the concave surface 24, 25 of the other flap to form a fluid passage 26 between the convergent flap 11 and the divergent flap 12. All of the part-cylindrical surfaces 22, 23, 24, 25 have essentially the same radius of curvature, thereby allowing the part-cylindrical surfaces of one component 11 to sealably contact the part-cylindrical surfaces of the other component 12 as the components 11, 12 pivot about the hinge pin 19. Fluid openings 27, 28 in the convergent and divergent flaps 11, 12 communicate with the hollow interior portions 29, 30 thereof thereby allowing fluid to flow from the interior 29 of the convergent flap 11 through the hinged fluid passage 26 and into the interior 30 of the divergent flap 12.

In the preferred embodiment, the seal members 15, 20 are flexible so as to maintain sealing contact between each convex surface 22, 23 and the concave surface 24, 25 in contact therewith. The sealing effectiveness of the part-cylindrical surfaces 22, 23, 24, 25 is further increased by the pressure differential between the fluid flowing through the hinged passage 26 and the ambient pressure of exhaust gas flowing across the exterior of the hinged fluid passage assembly. It is to be understood that in actual use, the fluid flowing from the convergent flap 11 to the divergent flap 12 through the hinged passage of the present invention would be prevented from flowing out the longitudinal ends of the passage 26 by the sidewalls of the two-dimensional nozzle (not shown).

Although this invention has been shown and described with respect to detailed embodiments thereof, it will be understood by those skilled in the art that various changes in form and detail thereof may be made without departing from the spirit and scope of the claimed invention.

I claim:

1. A hinged fluid passage assembly comprising:
   a first component and a second component, each of said components including
   a hollow interior portion,
   a seal member extending from a first surface of the component, said seal member having a convex part-cylindrical surface, said convex surface having a first radius of curvature,
   a seal support member extending from the first surface, said seal support member having a concave part-cylindrical surface, said concave surface having a second radius of curvature essentially equal to the first radius of curvature,
   at least one opening communicating with the hollow interior portion, the opening located between the seal member and the seal support member extending from the component,
   at least one lug extending from the component and having a pin hole therein, and
   means for pivotably connecting each component to the other component;
   wherein the convex part-cylindrical surface of each component slidably engages the concave part-cylindrical surface of the other component in sealing contact as the second component pivots relative to the first component.

2. The hinged fluid passage assembly of claim 1 wherein the seal members and the seal support members are in spaced relation to the means for pivotably connecting the components, providing a fluid passage therebetween.

3. The hinged fluid passage assembly of claim 2 wherein the means for pivotably connecting the components includes
   a hinge pin extending through the pin holes pivotably connecting the first component to the second component.

4. The hinged fluid passage assembly of claim 1 wherein each of the first and second radii of curvature are centered on the hinge pin.

* * * * *